(12) United States Patent
Tognetti et al.

(10) Patent No.: US 8,215,259 B2
(45) Date of Patent: *Jul. 10, 2012

(54) AUTOMOTIVE TIRE DRESSING APPLICATOR

(75) Inventors: David L. Tognetti, Howell, MI (US);
Mark D. Morin, Plymouth, MI (US);
Michael J. Belanger, Novi, MI (US);
Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 608 days.

This patent is subject to a terminal disclaimer.

(21) Appl. No.: 12/363,866

(22) Filed: Feb. 2, 2009

(65) Prior Publication Data

US 2009/0252882 A1    Oct. 8, 2009

Related U.S. Application Data

(63) Continuation-in-part of application No. 12/257,881, filed on Oct. 24, 2008, now Pat. No. 8,109,227, which is a continuation-in-part of application No. 12/062,996, filed on Apr. 4, 2008, now Pat. No. 7,585,367.

(51) Int. Cl.
*B05C 1/00* (2006.01)
*B05C 1/06* (2006.01)
*B05C 1/08* (2006.01)
*B05C 11/00* (2006.01)
*B08B 3/00* (2006.01)
*B08B 3/04* (2006.01)
*B60S 3/00* (2006.01)
*A47L 25/00* (2006.01)

(52) U.S. Cl. ........ 118/264; 118/255; 118/258; 134/123; 15/53.2; 15/53.4; 15/77

(58) Field of Classification Search ..................... None
See application file for complete search history.

(56) References Cited

U.S. PATENT DOCUMENTS

| | | | |
|---|---|---|---|
| 2,577,339 A * | 12/1951 | Lee | ................................. 118/261 |
| 3,678,848 A * | 7/1972 | Roser et al. | .................... 118/264 |
| 4,192,036 A | 3/1980 | Heymann | |
| 5,127,123 A | 7/1992 | Belanger | |
| 6,260,225 B1 * | 7/2001 | Bowman | ........................ 118/264 |
| 6,461,429 B1 | 10/2002 | Gorra | |
| 6,461,685 B2 | 10/2002 | Gorra | |
| 6,625,835 B1 * | 9/2003 | Frost et al. | ......................... 15/77 |
| 6,936,104 B2 | 8/2005 | Gorra | |

* cited by examiner

*Primary Examiner* — Dah-Wei Yuan
*Assistant Examiner* — Binu Thomas
(74) *Attorney, Agent, or Firm* — Young Basile Hanlon & MacFarlane PC

(57) ABSTRACT

A tire dressing applicator comprises a support and one or more foam plastic elements mounted on the support so as to contact a tire sidewall and transfer dressing onto the tire sidewall. A distribution system drips or drizzles dressing onto the element(s) after which it is spread over and into the element(s) surface. The elements can be toroidal or rectangular and have anti-distortion pins embedded therein.

5 Claims, 11 Drawing Sheets

AUTOMOTIVE TIRE DRESSING APPLICATOR

CROSS-REFERENCE TO RELATED APPLICATION

This application is a continuation-in-part of the U.S. patent application Ser. No. 12/257,881 filed Oct. 24, 2008 now U.S. Pat. No. 8,109,227, which is a continuation-in-part of application Ser. No. 12/062,996 filed Apr. 4, 2008, now U.S. Pat No. 7,585,367 and claims priority to the earliest filing dates thereof to the extent of common patentable subject matter. The entire contents of application Ser. Nos. 12/257,881 and 12/062,996 are incorporated herein by reference.

FIELD OF THE INVENTION

This invention relates to tire dressing applicators and more particular to a tire dressing applicator comprising one, or more foam applicators mounted adjacent and parallel to a path of tire travel, usually in a car wash facility.

BACKGROUND OF THE INVENTION

Commercial car wash operations often include optional extra cost features such as undercarriage wash, rust inhibitor application and tire dressing application. One known method of tire dressing applicator comprises an elongate pad open cell foam plastic which can be saturated with tire dressing by means of internal nozzles and brought into a position where the outer surface of the pad engages the sidewall of the tires of a vehicle which is rolling past the applicator on a conveyor. This applicator necessarily uses reticulated foam which is capable of allowing the dressing to migrate from an interior cavity to an outer surface and is shown in U.S. Pat. Nos. 6,936,104, 6,461,685 and 6,461,429.

In these devices, the pad is mounted on a bracket which can be moved toward the path of tire travel until it is in a position where it will make contact with the tire sidewall surfaces as the vehicle passes through the tire dressing station. There is often a strong scuffing or brushing interaction between the tire sidewall and the outer pad surface during dressing application. This interaction can give rise to rapid pad wear and a requirement for frequent replacement. Other problems in prior art tire dressing applicators include the fact that they are generally only suitable for use with one type of tire dressing; i.e., a tire dressing having a single chemical composition, and, in addition, are wasteful of dressing liquid as a result of oversaturation of the pad and consequent dripping of the dressing onto the carwash floor.

SUMMARY OF THE INVENTION

The present invention provides improvement to tire dressing applicators of the type using pads and/or other applicator elements placed beside a path of vehicle travel so as to contact the tire sidewall and transfer dressing to the sidewall during movement of the vehicle past the dressing application station.

In accordance with the invention, the applicator comprises one or more elements made of a foam plastic such as polyurethane, which elements are reinforced internally by pins or rods adhered to the foam along their lengths to prevent or reduce shape distortion during the application process.

In an illustrative embodiment hereinafter described, the elements are foam rollers and the reinforcing pins are hollow, made of plastic, and are arranged within the foam to extend parallel to the axis of rotation of the roller or rollers. Adhesive of the same chemical composition as the pin or roller is preferably used to bond the pins to the foam. Plastic washers and are placed between rollers to act as separators and thrust bearings during operation. Alternatively, plastic end rings are attached to the pins to form a cage within each roller.

BRIEF DESCRIPTION OF-THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Referring now to FIGS. 1-8, there is shown a tire dressing application station 10 generally designed to be used in a conveyor-type car wash wherein vehicles to be washed are caused to travel along the length of a conveyor having tire guides 15 by means of a mechanism (not shown) which engages and pushes on the left front wheel. Vehicle travel direction is indicated by the large arrow. Accordingly, the left side of the vehicle is generally fixed relative to the station 10 whereas the right side of the vehicle varies in location depending on the width of the vehicle. For a better understanding of a usable conveyor system, the reader may refer to either or both of U.S. Pat. No. 4,576,098 issued Mar. 18, 1986 and assigned to Belanger, Inc., or published application no. 2007/6284223 dated Dec. 13, 2007, also assigned to Belanger, Inc.

Figure 1:
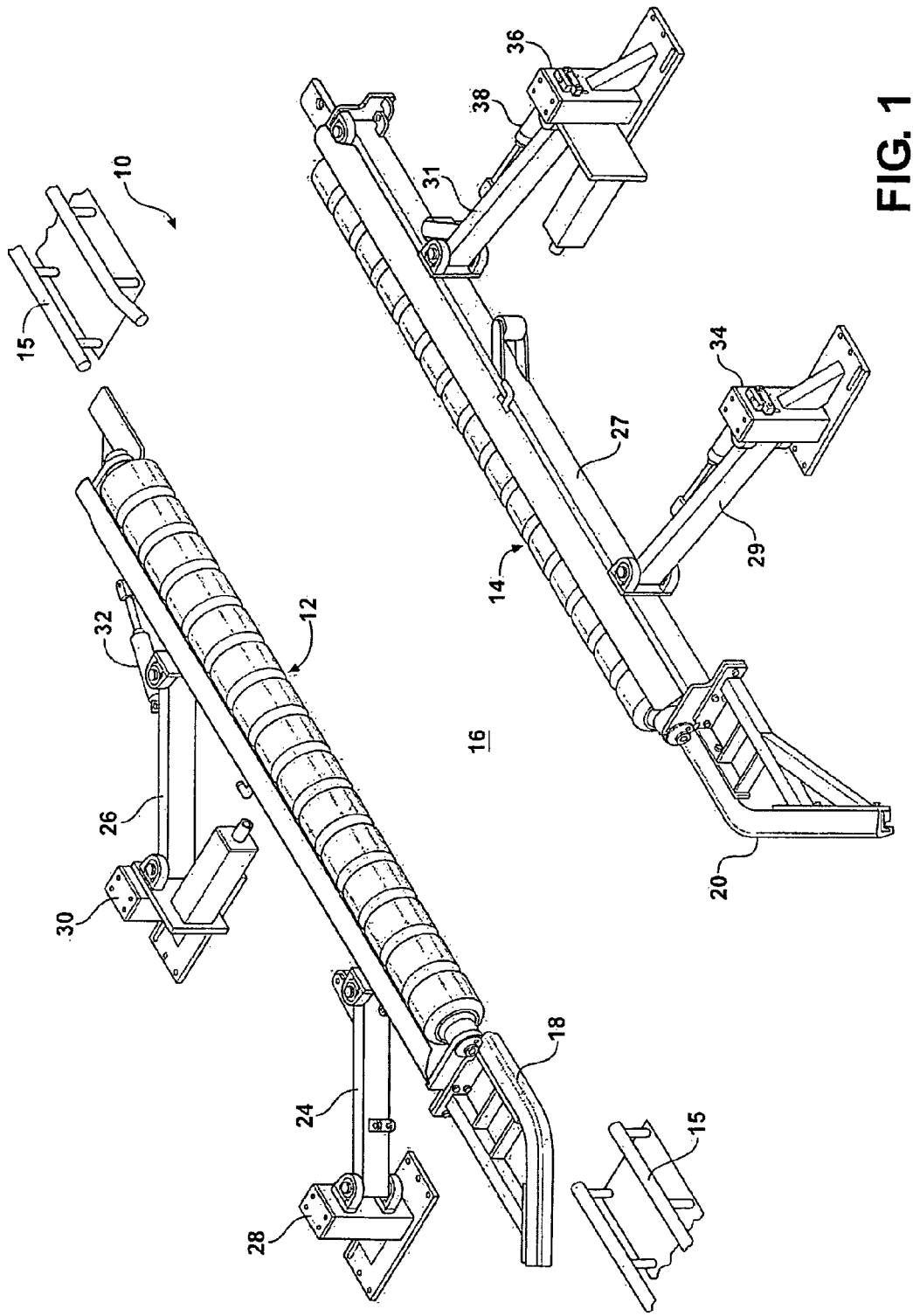
FIG. 1 is a perspective view of a two-sided tire dressing application station having applicators in the form of two elongate sets of serial rollers, one on each side of a vehicle track extending from left to right as viewed in FIG. 1.

The tire dressing application station 10 comprises two parallel sets of non-reticulated polyurethane foam tire dressing application rollers 12, 14 mounted on rotatable three-inch diameter stainless steel shafts 40 (FIGS. 2, 4 and 5) which are themselves generally adjacent and parallel to the vehicle path of travel 16 between the roller sets 12, 14. Entry guides 18, 20 are provided on opposite sides of the vehicle-travel path 16 as shown in FIG. 1 and left side tire guides 15 which are part of the conveyor are also typically used, as persons skilled in the art of conveyor-type car washing installations will readily appreciate. While a two-sided system is typical and preferred, a single-sided system can also be used.

The support shaft 40 for foam rollers 12 is connected to a bracket 22 which is pivotally mounted to the outside ends of parallelogram arms 24, 26. These arms are in turn, pivotally mounted to support stanchions 28, 30 bolted to a concrete floor so that the set of rollers 12 may be moved in parallel fashion toward and away from a vehicle in the path of travel 16 as necessary to position the rollers 12 for contact with the sidewall of the tires of the vehicle passing along the left side of the path of travel 16. An hydraulic actuator 32 is provided for the purpose of moving the bracket 22 in and out. Further details of the manner in which the rollers 12 and the shaft 40 are connected to the bracket 22 will be provided with reference to FIGS. 2 and 3.

The opposite side roller set 14 is also mounted by means of a bracket 27 and pivotally mounted parallelogram arms 29, 31 to floor mounted stanchions 34, 36. Since the in and out travel needed to properly position the rollers 14 is greater than that of the opposite set of rollers 12 due to varying vehicle widths, the parallelogram arms 29, 31 are longer than the arms 24, 26 and the drive cylinder 38 is mounted in a somewhat different fashion.

Figure 2:
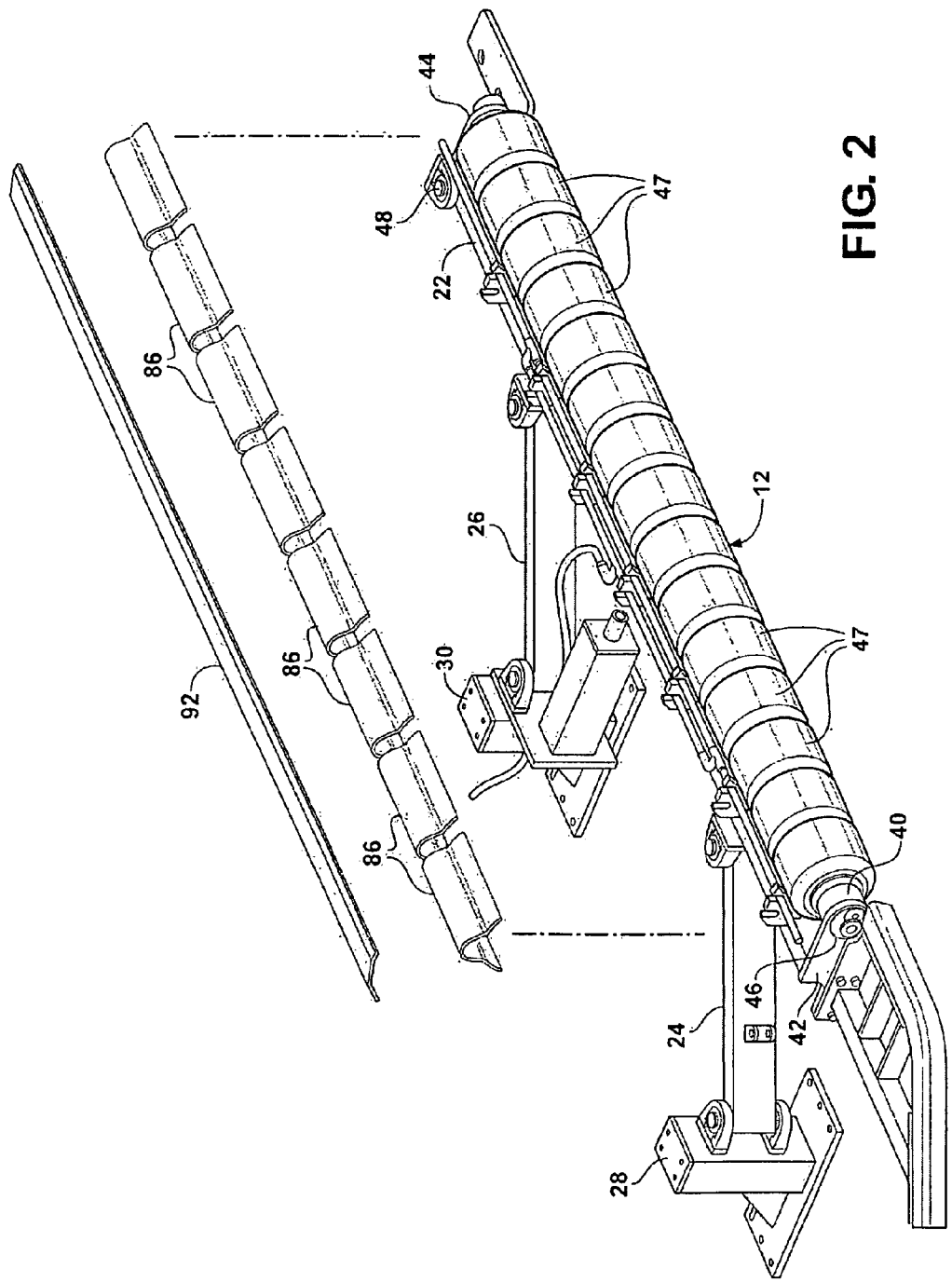
FIG. 2 is a perspective view of one of the sets of rollers from the installation of FIG. 1 showing various components of the system in detail.

Now that the overall nature of the installation has been described, details of only one side will be described with reference to FIGS. 2 through 5 with the understanding that, insofar as this description is concerned; the roller sets 12 and 14 are essentially alike. Referring to FIG. 2, the rollers 12 are shown mounted in a serial fashion on a shaft 40 between bracket ends 42, 44. At the bracket end 42, the shaft 40 is mounted by way of a quick-release latch mechanism 46 including a spring-biased pin which, when pulled out to the left as shown in FIG. 2, allows the shaft 40 to be disengaged from the bracket end 42. A pivot 48 on the opposite end of the shaft; i.e., near the bracket end 44, permits the shaft 40 and the rollers 47 to be moved outwardly from the bracket 22 for roller replacement purposes. Replacement is achieved simply by sliding the rollers 47 off of the shaft 40 and replacing them, with new rollers as necessary.

Figure 3:
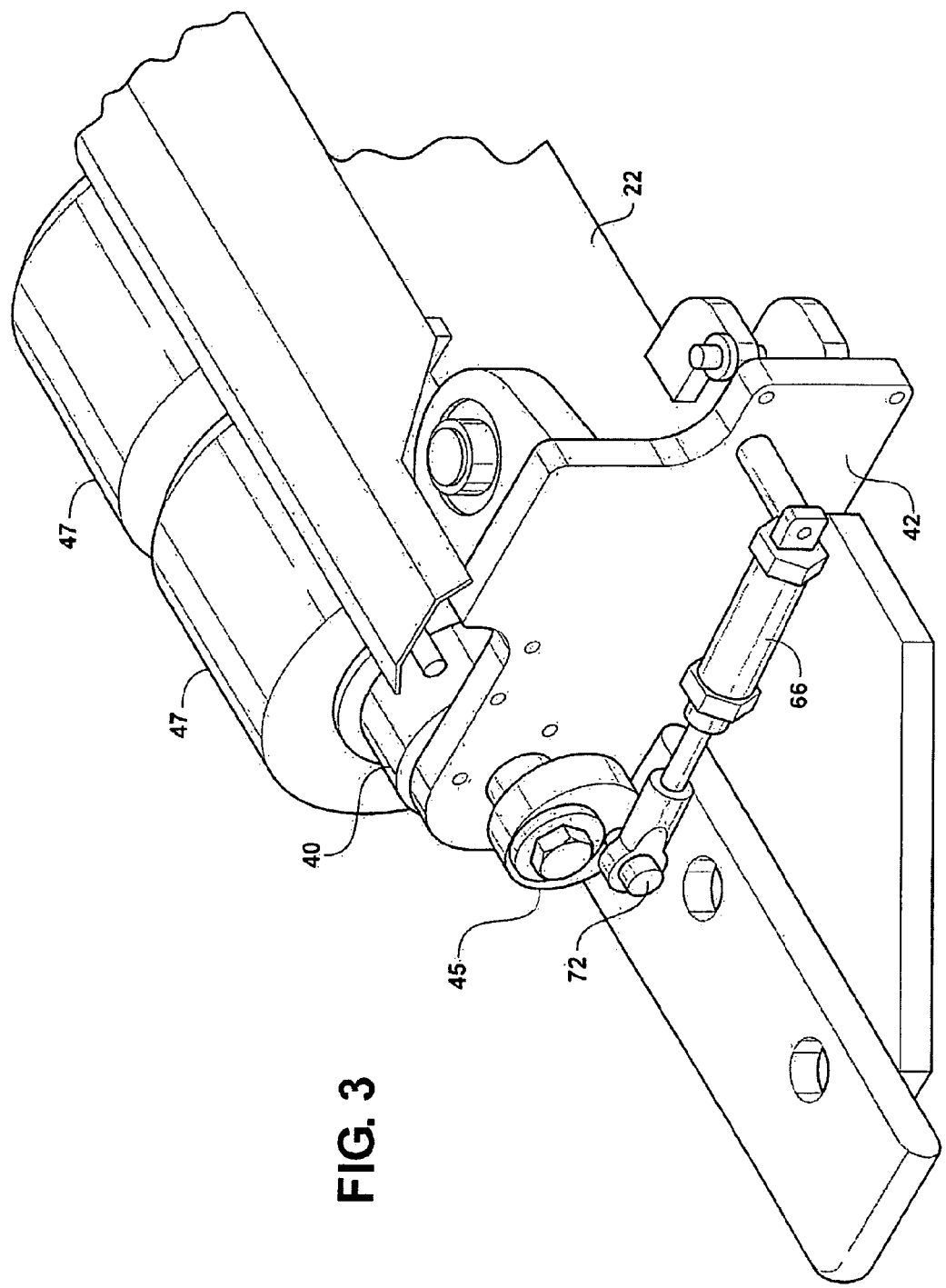
FIG. 3 is a perspective close-up of a portion of a system of FIG. 2 showing one of the available types of roller shaft drive mechanisms.

Referring to FIG. 3, the details of a shaft drive system are shown to comprise a wheel 45 which is eccentrically connected to the shaft 40 on which the rollers 47 are mounted so as to be rotated therewith. The wheel 45 is eccentrically mounted and is connected by fitting 72 to a linear actuator in the form of an hydraulic cylinder 66 having output shaft 68. The grounded end of the cylinder 66 is connected to a bracket 72 which, in turn, is connected to the end plate 44 of the bracket 22. The cylinder 66 operates in the fashion of a motor to incrementally and unidirectionally rotate the shaft 40 on which the rollers 14 are mounted. This incremental rotation, typically about 90°, may occur once every two or three minutes, or more rapidly after a rest period and immediately before a vehicle, which has selected the tire dressing application option, approaches the station 10. Alternatively, it may be continuous, i.e., occurring every two to five seconds.

As another alternative, the cylinder 66 may be replaced with a motor and gear set to rotate unidirectionally, continuously and slowly so as to produce continuous or near-continuous rotation of the rollers 47. For example, the rotation may be such that each roller 47 completes a 360° rotation, when rotating with the shaft 40, in about one or two minutes.

Figure 4:
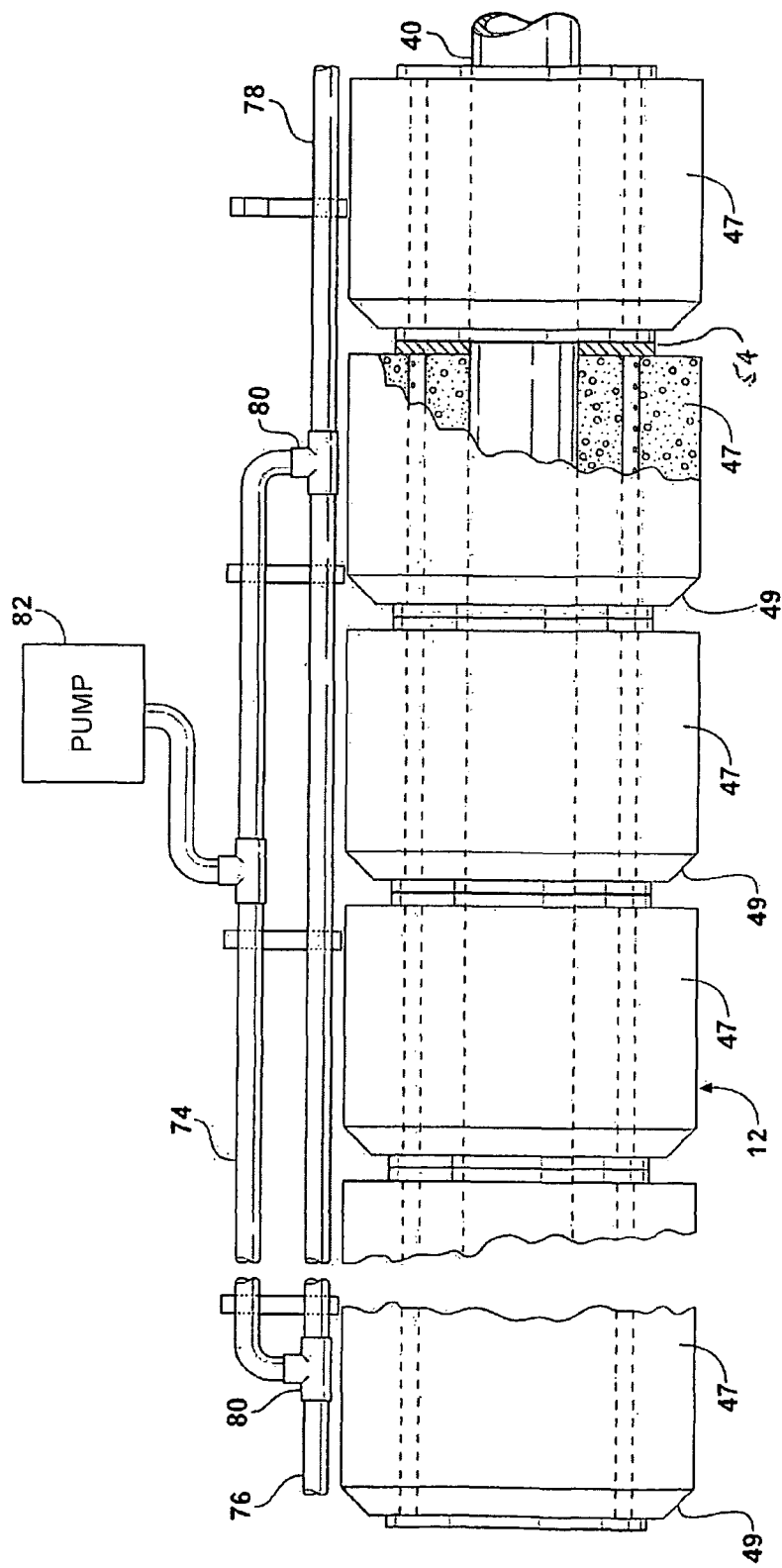
FIG. 4 is a detailed, partially sectioned view of a series of rollers showing one way in which the rollers can be constructed as well as the manner in which the rollers are mounted on a shaft so that dressing can be dispensed onto the upper surfaces of the rollers.
Figure 6:
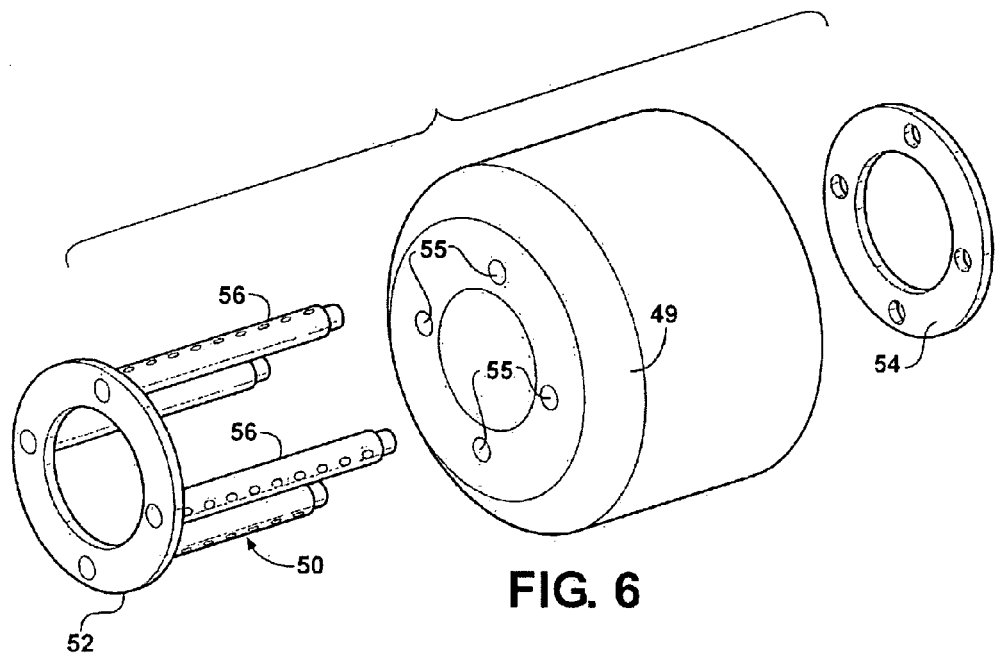
FIG. 6 is an exploded view of one illustrative roller embodiment.
Figure 7:
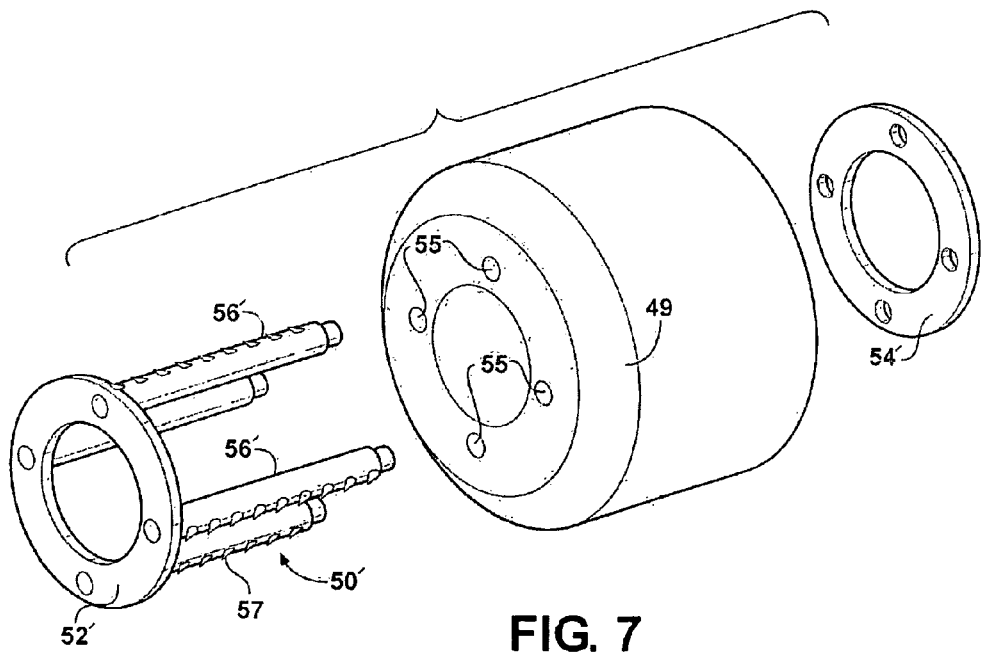
FIG. 7 is an exploded view of a second illustrative roller embodiment.

Referring to FIGS. 4, 6 and 7, the details of each roller 47 will be described in detail. In FIG. 4, the direction of vehicle travel is from left to right. As shown in the figures, each foam roller 47 comprises an internal cage 50 made up of hard plastic annular end rings 52, 54 connected by hollow plastic pins 56 which are permanently adhesively connected between the rings after the pins are slipped through the pre-formed holes 55 in rollers 47. This forms a cage. The pins or rods 56 are preferably cross-drilled and hollow so as to permit adhesive to be injected into and through them for purposes to be momentarily described.

FIG. 7 shows an alternative construction in which all components are given the same reference numbers as the corresponding components in FIG. 6 except the numbers are "primed" in FIG. 7. The difference is that the pins 56' of FIG. 7 are provided with the one-way barbs 57 which allow the pins 56' to enter the holes 55 in the foam rollers 47 during assembly, but resist reverse movement.

Figure 5:
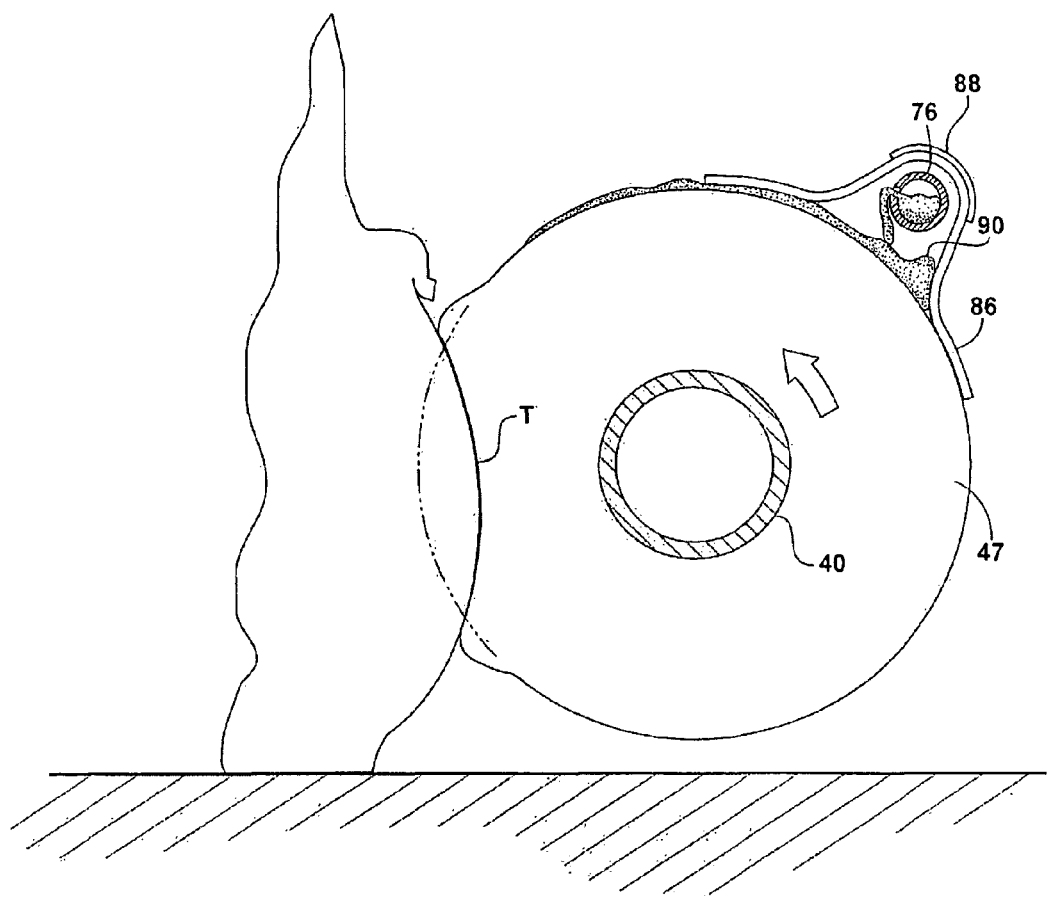
FIG. 5 is a side view of a roller showing how a spreader flap is arranged over a dressing dispenser pipe placed adjacent the outer tire contacting surface of the roller to distribute dressing over the roller surface and reduce waste.

The purpose of the adhesive and/or the barbs 57 is to prevent distortion of the foam rollers as they frictionally engage a tire sidewall as shown in FIG. 5; i.e., the friction will tend to cause the roller foam to bunch up and the adhesive or barbs prevent this. It also helps in this regard to provide a bevel 49 on the leading edge of each roller 47 in both sets 12 and 14 as shown in FIGS. 1, 2, 4, 5, 6 and 7.

Each roller 47 comprises a toroidal volume of non-reticulated foam plastic mounted on the pins 56 so as to fully encompass the pins 56 which extend through apertures 55 through the toroidal foam volume. As stated above, adhesive is preferably injected into the pins 56 after they are embedded in the foam volume 58 so as to create an adhesive bond all along the length of the pins 56. This has been found to prevent lateral distortion of the foam volume 58 during the operation of the dressing application station 10. The adhesive can be applied other ways; for example, it may be applied to the pins in the form of tape loaded with an adhesive that is slippery when wet-like that used to slide golf club shafts into rubber grips.

Referring further to FIGS. 2, 4, 5, 6 and 7, the dispensing system is shown to comprise a pump 82 connected by means of a T-fitting to a manifold or distribution pipe 74 which, in turn, is connected by T-fittings 80 to pipes 76, 78 which run parallel to and immediately adjacent the outside tire contacting surfaces of the rollers 47 in the set 12. The pump is operated at a low pressure so as to cause the tire dressing 90 to be slowly pumped or "drizzled" rather than sprayed onto the outside surfaces of the rollers 47 at or near the top of each roller as shown in FIG. 5. A felt flap 86 is held in place by means, of a clip 88 over the pipe 76 in such a way as to engage or nearly engage the outside surface of the roller 47 both before and after the surface passes by the pipe 76, thereby to dam up and spread the dressing 90 relative to the outside tire contacting surface of roller 47. This not only distributes or spreads the tire dressing 90 but also drives it into the pores of the foam plastic rollers so as to load up the rollers and prevent spraying, dripping or other types of dressing loss which add unnecessarily to the operating cost of the system. An aluminum cover 92 is provided as shown in FIG. 2.

Figure 8:
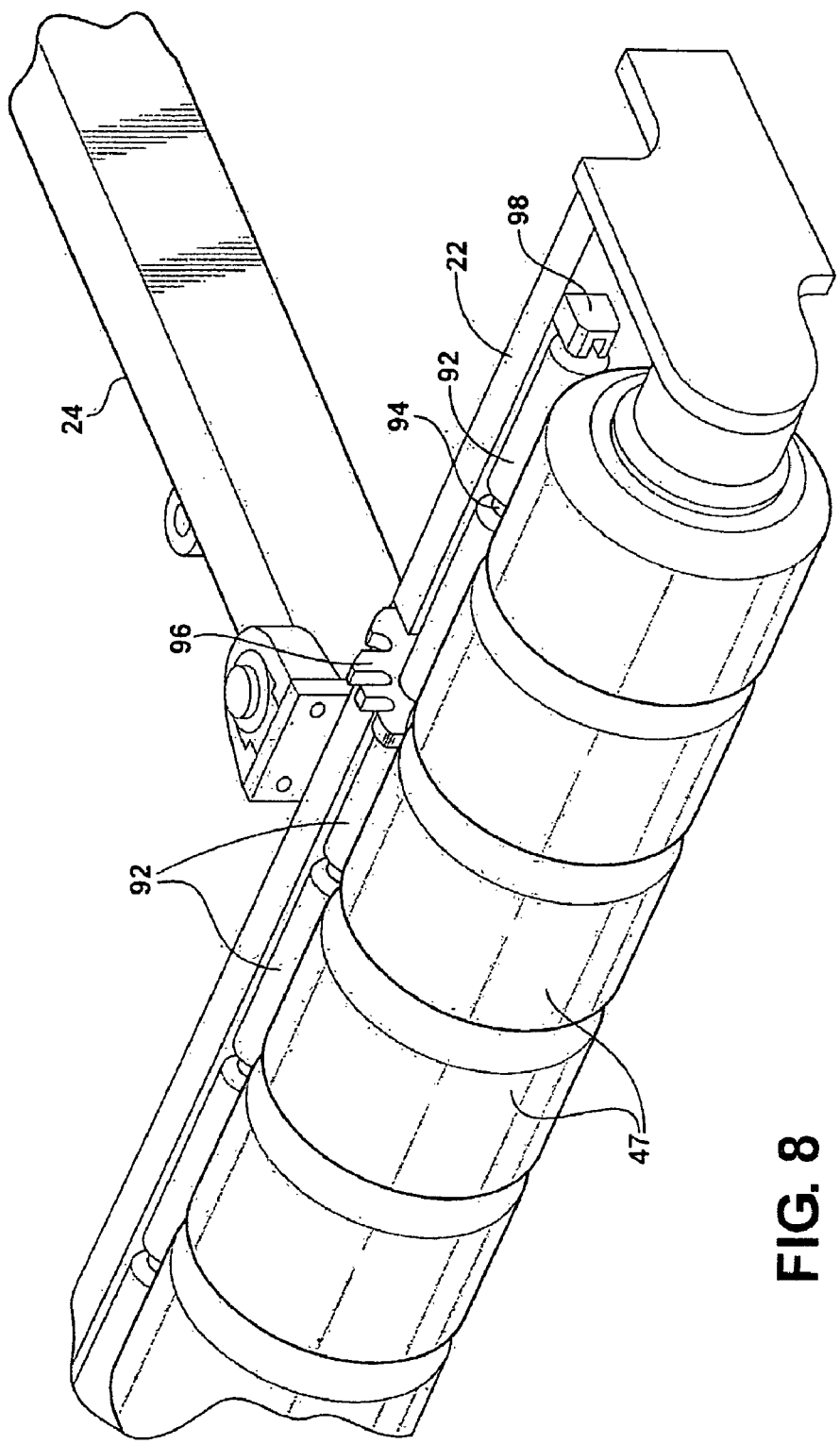
FIG. 8 is a perspective view of an illustrative dressing spreader embodiment.

FIG. 8 illustrates an alternative to the felt flap 86 for spreading dressing over the surfaces of rollers 47. In FIG. 8, foam idler rollers 92 are mounted on a shaft 94 which is parallel to shaft 40 and rotatably mounted by and between brackets 96 and 98. There is a roller 92 for each roller 47 and their-outer surfaces engage each other like gears. Rollers 92 may be made of any suitable material, but can be conveniently made from the cores which are removed from the rollers 47 to create the center opening which receives shafts 40. Rollers 92 are non-driven idler rollers which spread dressing essentially in the same way as flap 86.

There are a variety of changes and modifications which can be made to the system as described. Some such modifications are described in our co-pending application Ser. No. 12/062,996 filed Apr. 4, 2008, the disclosure of which is incorporated herein by reference. The present invention is believed, at this time, to be optimum in conserving dressing, accommodating different types of dressing including both water-based and oil-based dressing, promoting long life in the roller pad or pads, making replacement of pads as simple and fast as possible and generally providing effective and efficient transfer of dressing from the dispensing system to the sidewalls of the tires T on vehicles passing through a commercial car wash. The rollers described in this document have been found to have long life and effective operation in holding all types of tire dressing including the more runny or liquid water-based dressings, in such a way as to prevent unnecessary loss or waste thereof. The overall length of the system described herein is typically approximately six or eight feet and may use as many rollers as the designer finds practical. Rollers 47 may be about 8 inches wide, but wide variations in this dimension are possible as explained above.

A feature of the present invention is the fact that the rollers 47 can be driven by an actuator or motor, but are nevertheless free to rotate to accommodate the relative vertical motion of a passing tire sidewall. To achieve this freedom, rollers 47 are mounted on their respective drive shafts 40 in a frictional fashion, so that they can rotate both with and relative to the drive shafts. Rotation with the shafts 40 is the normal situation when the rollers are not in contact with the vehicle tire sidewall; e.g., when the rollers are being loaded with tire dressing prior to the approach of a vehicle. When the incremental shaft rotation of motor 66, 68 is operated, all of the rollers 14 rotate with the shaft in unison. However, when a tire sidewall is engaging the outer surfaces of the rollers 14 or any one or more of them, such contact may prevent rotation of the particular roller or rollers with their support shaft or, instead, cause; rotation relative to the shaft due to the relative up or down travel-direction of the tire sidewall relative to the outside surface of the contacting roller or rollers. By permitting rollers to rotate on the shaft as well as with the shaft, unnecessary wear of the roller material is greatly reduced or eliminated. A similar or equivalent function can be achieved in other ways; an example is to create the freedom of roller rotation through the use of a clutch which disengages the shaft drive between increments and allows the entire assembly of shaft 40 and rollers 47 to rotate as necessary when engaged by a tire sidewall.

Figure 9:
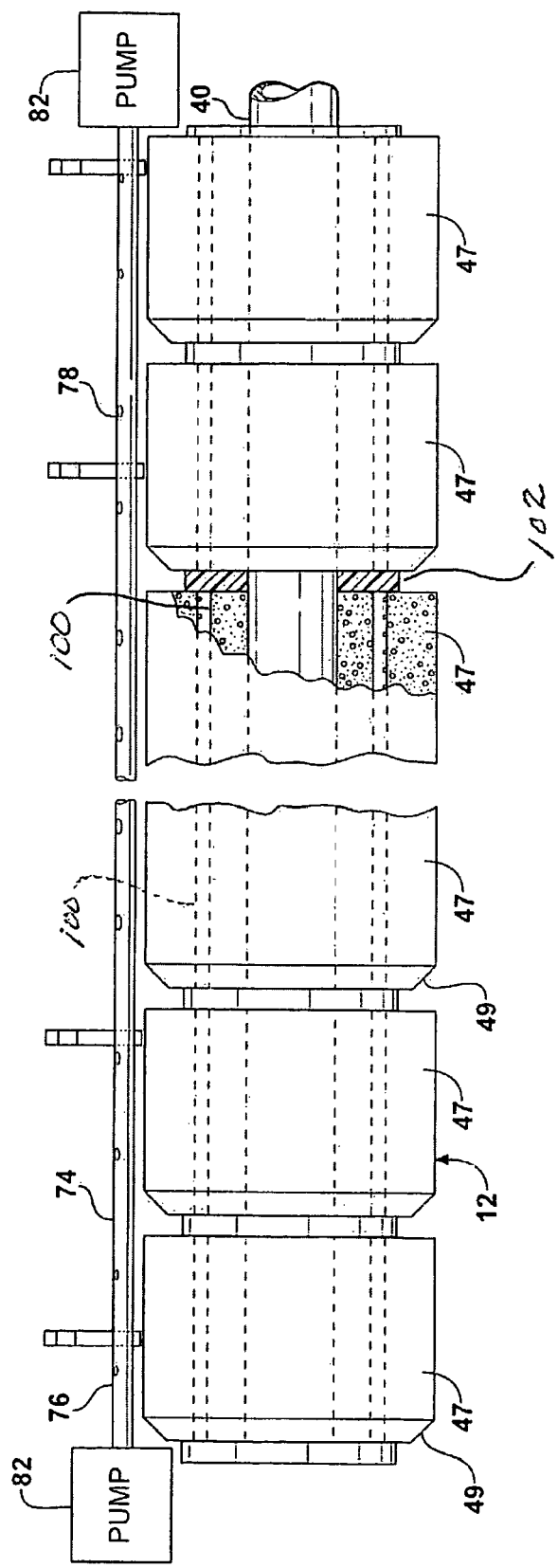
FIG. 9 is a side view, partly in section, of another serial roller embodiment with a dressing discharge conduit.
Figure 10:
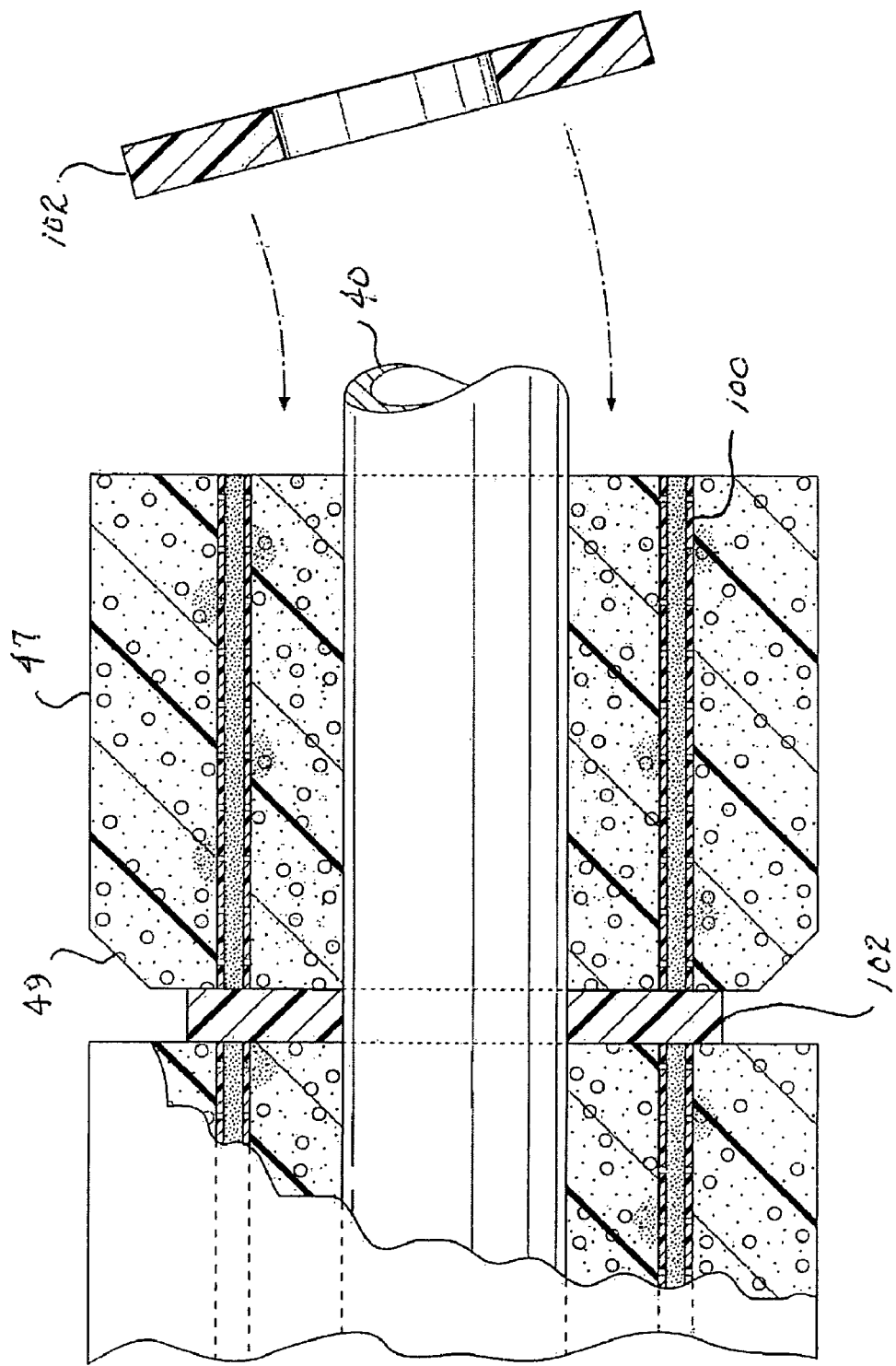
FIG. 10 is a side view in section or rollers from the FIG. 9 embodiment showing interval detail.

Referring to FIGS. 9 and 10, a second embodiment of the invention similar to the embodiment of FIGS. 2, 4 and 5, is shown, this embodiment comprises toroidal foam plastic applicator rollers 47 mounted on a shaft 40 for both rotation with and independently of the shaft as previously described. In addition each of the rollers 47 is beveled at the leading edge 49 as also shown in FIGS. 2, 4 and 5. Further, each of the rollers 47 is reinforced for protection against lateral distortion under load by a plurality of embedded hollow plastic pins 100 which are adhered to the foam plastic rollers 47 along their lengths. Four or five such hollow pins 100 are arranged within the foam plastic volume of each of the rollers 47 essentially as shown in FIG. 6 and the adhesive bond between the pins 100 and the roller 47 is achieved by pumping adhesive into the pins in such a way that it flows: outwardly through the cross-drilled holes shown in FIG. 9.

Unlike the embodiment of FIGS. 2, 4 and 5, the pins 100 are not connected to end plates or disks to form a cage. Rather, independent hard plastic thrust bearing washers 102 are placed on the shaft 40 between each of the rollers 47 so as to remain independent of the rollers. Thus, when it is necessary to replace rollers 47, the shaft 40 is accessed in, for example, the manner described with reference to FIG. 2 and both rollers 47 and thrust washers 102 are slipped off of the shaft as desired. When the rollers are replaced, the thrust washer disks 102 can be reused by assembling them back onto the shaft 40 such that a washer 102 appears between each of the rollers 47 in the series making up the applicator 12. Again, the rollers 47 may be on the order of 8 inches in diameter and are made of a non-reticulated foam, such as urethane capable of holding and transferring a suitable commercial tire dressing to the sidewall of an automotive tire. The foam rollers 47 have sufficient frictional engagement with the shaft 40 so as to rotate therewith when the shaft is either incrementally or continuously rotated by a suitable power actuator, as previously described. However, the frictional engagement between the foam plastic of the rollers 47 and the outer surface of the shaft 40 is low enough that the rollers 47 may also rotate on and independently of the shaft as well as independently of one another as may occur, for example, during contact between rollers 47 and the sidewall of a passing vehicle. Similarly, a roller 47 may be held stationary while the shaft 40 rotates within it.

As also shown in FIG. 9, the discharge conduit 74 for supplying dressing to the outer surfaces of the rollers 47 is connected between a pair of opposite end pumps 82. The pumps can be turned on and off as necessary to discharge and/or stop discharging dressing from a supply source onto the outer surfaces of the rollers 47 at or near the tops of the rollers in a closely controlled fashion. By locating the discharge apertures 78 in or near the top of the conduit 74, the discharge is in the manner of dripping or drizzling and the discharge starts when pump pressure ramps up and stops when pump pressure ramps down. This reduces or eliminates dripping and oversaturation of the rollers 47 with tire dressing.

As also shown in FIG. 9, the apertures 78 are arranged along the conduit 74 so that there are two apertures over each of the rollers 47. In addition, the apertures change progressively in size from smaller near the pumps 82 to larger at maximum distance from the pumps 82 thereby to equalize the hydraulic resistance to dressing flow. This tends to equalize the amount of dressing that is discharged during any pump cycle onto the surfaces of the roller 47, an approach which promotes uniformity in the amounts of dressing applied to each of the rollers 47 in the series.

Figure 11:
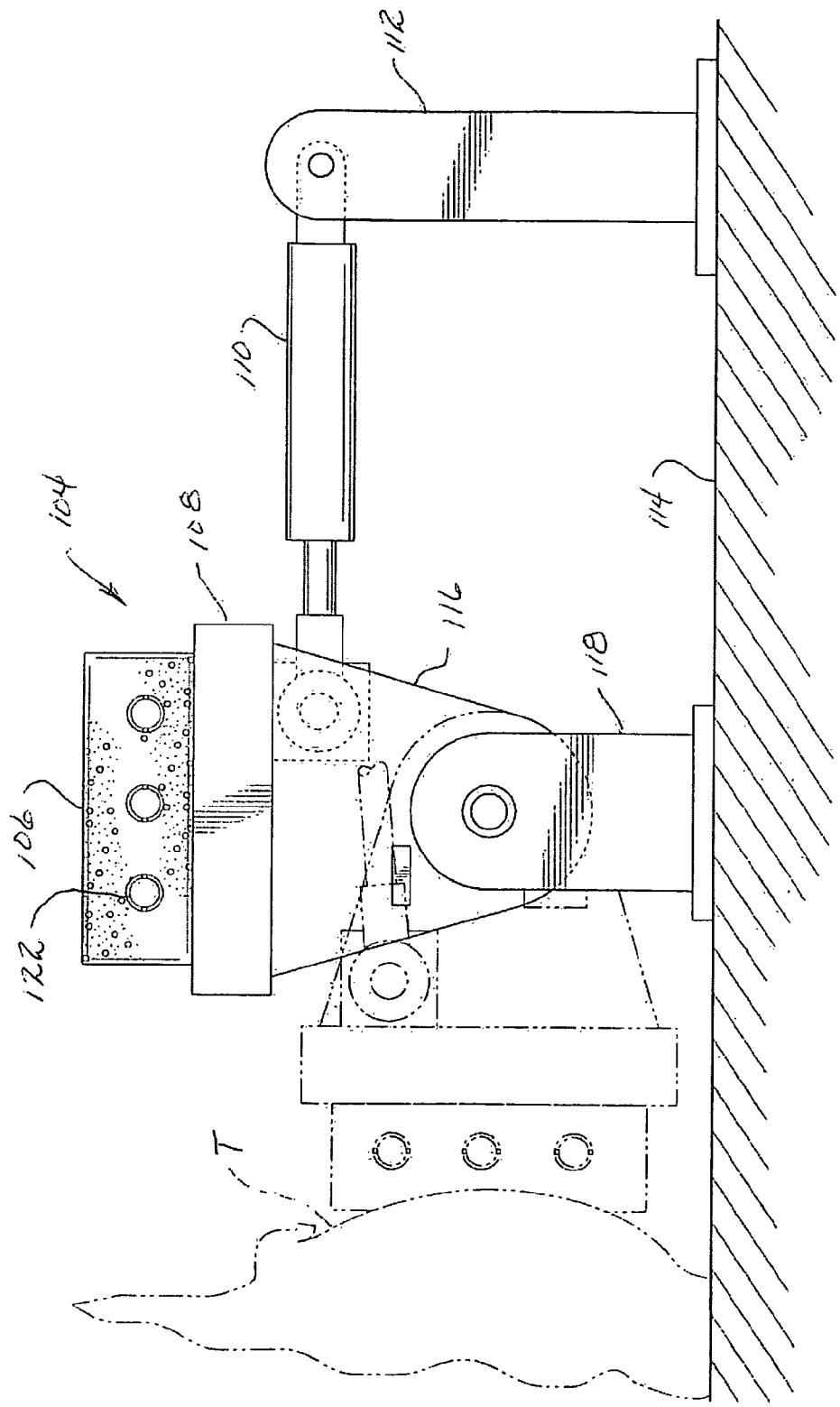
FIG. 11 is a side view of an alternative applicator construction.
Figure 12:
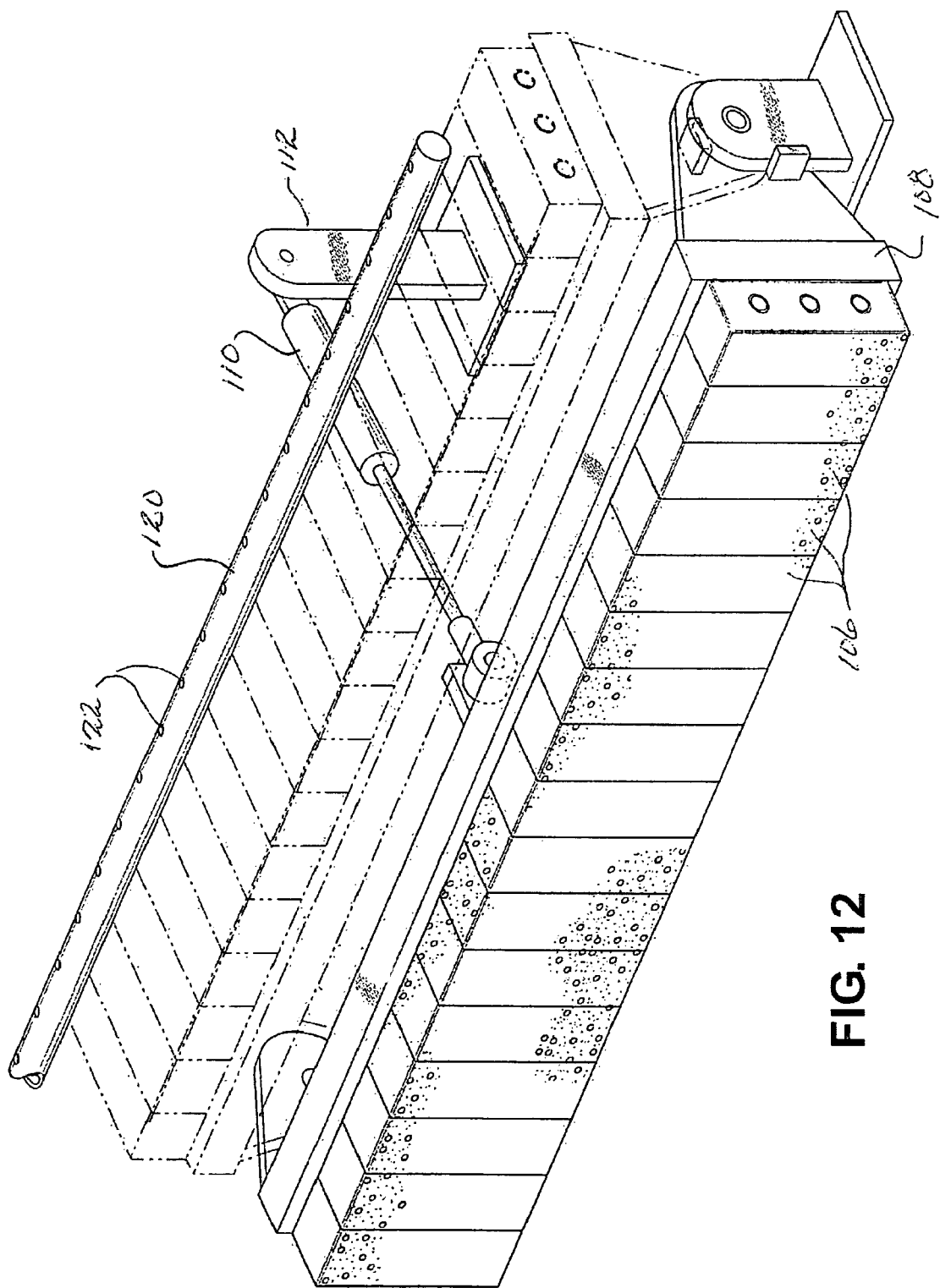
FIG. 12 is a perspective view of the alternative applicator construction.

Referring now to FIGS. 11, 12, there is still a further embodiment of the invention in the form of an applicator 104 made up of the series of essentially rectangular urethane foam elements 106 arranged in series on a carrier 108 carrying dressing to the sidewall of the tire T which is rolling past the applicator 104. The applicator elements can be positioned by an actuator 110 in a raised or "loading" position as shown by the solid lines in FIG. 11 and/or to an "applying" position as shown by the solid lines in FIG. 12 and by the broken or dashed lines in FIG. 11. The actuator 110 is mounted for operation between a support post 112 bolted to the floor 114 of the car wash installation and a bracket 116 which support the carrier 108. The bracket 116 is pivotally mounted to and between a pair of standards 118 which are also connected to the floor. Hollow plastic pins 122 are embedded in and through the volumes of foam plastic in the applicator elements 106 to maintain, shape when the applicator elements are under load as previously described. The pins 122 extend only through individual elements or through a series of elements 106 and are adhesively bonded thereto in the manner described with reference to FIGS. 6, 7.

When the applicator elements 106 are in the raised or loading position shown by solid outlines in FIG. 11, they are immediately underneath the supply conduit 120 which is provided with apertures 122 for discharging dressing onto the then horizontal surfaces of the applicator elements 106. Although not shown it is to be understood that a suitable wiper, such as a felt flap, is placed in the assembly so as to spread the dressing over the surfaces of the elements 106 as they are moved by the actuator 110 from the horizontal loading position as shown in FIG. 11 to the vertical applying position or orientation shown by solid lines in FIG. 12.

Accordingly, the foregoing specification describes with reference to a number of illustrative embodiments, two inventive aspects which are susceptible of the independent as well as the joint or combined use. The first aspect is the "drip and wipe" method of loading tire dressing onto and into the applicator elements as well as the apparatus involved in carrying out the method. The second aspect is the improved structure of the rollers themselves using the anti-distortion pins and separate thrust disks between rollers to facilitate rotation thereof.

What is claimed is:

1. A tire dressing applicator comprising:
   a shaft defining an axis;
   a mounting structure for mounting said shaft adjacent said path of tire travel and generally parallel thereto;
   a plurality of discrete toroidal foam plastic rollers mounted on the shaft in series relation;
     each of said rollers having a cylindrical contact surface and opposite end surfaces; and
   means for selectively, incrementally rotating the shaft about the axis less than a full revolution prior to contact between the rollers and a tire.

2. A tire dressing applicator as defined in claim 1 further including a plurality of elongate pins adheringly embedded in each of the rollers and extending entirely through said rollers between said end surfaces parallel to said axis.

3. A tire dressing applicator as defined in claim 2 further including a plurality of thrust washers individually disposed between adjacent rollers.

4. A tire dressing applicator as defined in claim 1 further including an elongate conduit disposed over said rollers and having discharge orifices formed therein so as to substantially evenly distribute tire dressing onto said rollers.

5. A tire dressing applicator as defined in claim 4 wherein the orifices vary in size.

* * * * *